Nov. 30, 1965     G. ANAGNOS     3,220,539
SCREW CONVEYOR
Filed July 12, 1963
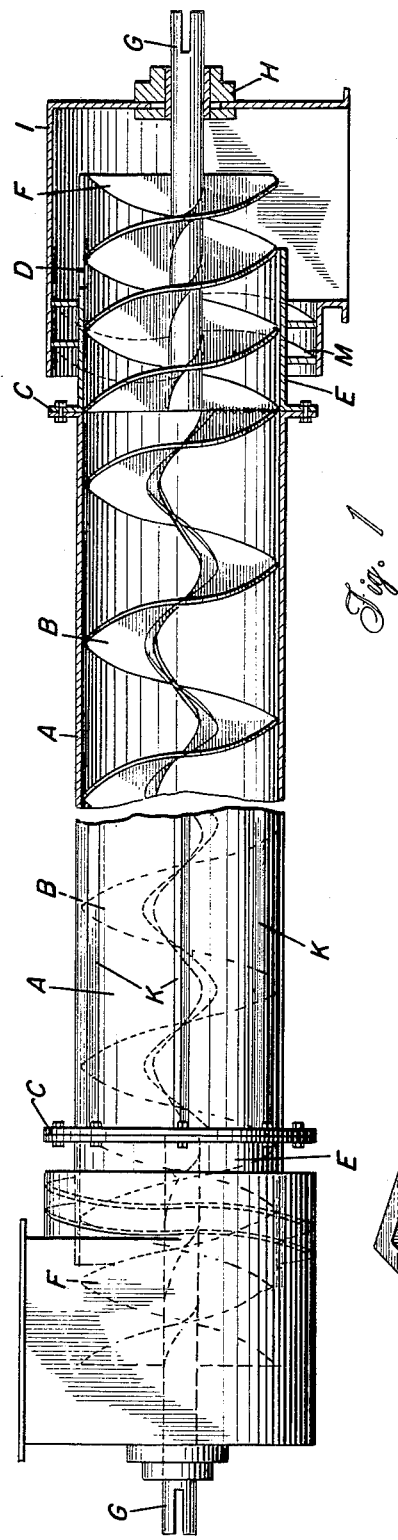
Fig. 1
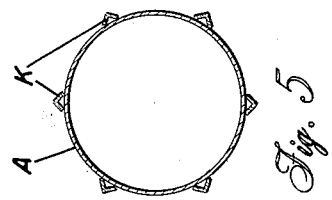
Fig. 5
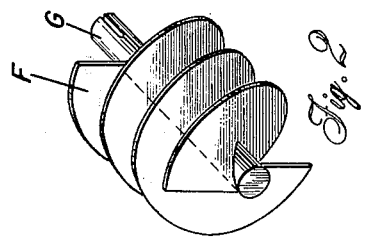
Fig. 2
Fig. 3
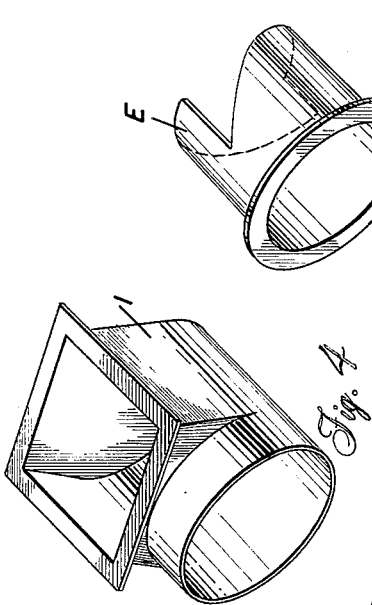
Fig. 4
INVENTOR
George Anagnos
by Wenderoth, Lind & Ponack
ATTORNEYS

United States Patent Office 3,220,539
Patented Nov. 30, 1965

3,220,539
SCREW CONVEYOR
George Anagnos, New Redruth, Alberton, Transvaal, Republic of South Africa (% A. Vranas, P.O. Box 8175, Johannesburg, Transvaal, Republic of South Africa)
Filed July 12, 1963, Ser. No. 294,659
Claims priority, application Republic of South Africa, Aug. 30, 1962, 3,664/62
1 Claim. (Cl. 198—213)

This invention relates to screw type conveyors which can be used for conveying granular, fibrous materials and the like.

Hitherto, conveyors of this type operated with a stationary trough and rotating flights of limited overall length which necessitated the use of intermediate internal supporting bearings for long conveyors. This invention has the advantages of eliminating these internal bearings and the friction arising from the internal separate rotating screws. In addition, this conveyor can be made of standardised steel pipes except for the ends (of which there are usually two) which are identical to each other and which are specially made. A further advantage is the fact that it is of closed construction.

An improved screw conveyor according to this invention comprises a rotating pipe into which an helix of flat steel is fixed internally, the ends of this rotating pipe having normal flights attached both to the pipe and to the supporting shafts, two stationary ends being provided which are identical to each other and which carry supporting standard bearings. Between the periphery of the stationary ends and the periphery of the said rotating pipe, there is sufficient clearance for additional external flights attached to the rotating pipe which prevent spillage of material from the stationary ends. There is no attrition or damage to the material conveyed because there are no internal moving parts and for the same reason the power required to drive this conveyor is relatively small. The said pipe and all the other parts of the conveyor may be made of metal or of any other suitable material.

An embodiment of this invention is illustrated in the annexed drawings it being understood that this invention is not limited to the embodiment so illustrated.

In the said drawings:

FIG. 1 shows the whole invention assembled, partly cut away to show the internal construction.

FIG. 2 shows the end supporting shaft attached to normal double start helical flights which may also be single start and which flights are internally attached to the end part shown in FIG. 3 whose helically cut edge matches the flights attached to the shaft which are shown on FIG. 2.

FIG. 3 shows the end part made of piping of the same diameter as the main rotating pipe and of sufficient length to carry the shaft of FIGURE 2 securely and to have enough free cylindrical external surface to carry sealing flights to prevent spillage from the stationary ends.

FIG. 4 shows one of the two stationary ends which carry the bearing, and which are of the common flange type, one of which bearings is shown on the unsectioned end of FIG. 1.

FIG. 5 is a section through the rotating pipe showing angles attached to the said pipe externally, from flange to flange, to provide stiffness and strength when pipe becomes worn after use.

In the said drawings:

A is the intermediate rotating pipe whose overall length can be made of pieces of pipe of standardised length with flanges at both ends, for attaching to the rest of the conveyor with normal bolts and nuts.

B is the helical flight made of flat steel which is integral with A, attached to A by welding at the ends.

C are the attaching flanges referred to above.

D are the external sealing flights attached to the outside of the end part shown in FIG. 3. The handing of the flights is such as to push the conveyed material inwards.

E is the end part which is attached to A and moves with A.

F are the normal flights which are attached to E and to the end shafts G, and rotate with E and G.

G are the end shafts.

H is the bearing of G. Such bearing is omitted from the sectioned end of FIG. 1 for clarity.

I are the fixed, motionless ends or hoppers of the conveyor. One is provided at the inlet and another at the discharge end. In operation, the material to be conveyed falls into part I, being the inlet and is then scooped by parts E and F and carried into the intermediate pipe A. The internal flights of pipe A carry it forward to the discharge end (being the opposite end) whence it is carried to the discharge opening by parts E and F at the said opposite end and is discharged.

L indicates the external sealing flights at one end of the apparatus and M shows the sealing flights at the other end of the apparatus to prevent spillage from the stationary ends.

Having now particularly described and ascertained my invention and the manner in which the same is to be performed, I now declare that what I claim is:

An improved screw conveyor comprising a rotating pipe, a helix of flat steel fixed internally in said pipe, shafts supporting said pipe at the ends thereof, normal flights attached both to said pipe and to said supporting shafts, two stationary ends, bearings mounted in said ends for said shafts, clearance being provided between the periphery of said stationary ends and the periphery of said rotating pipe, additional external flights being attached to said rotating pipe in said clearance to prevent spillage of material from said stationary ends.

References Cited by the Examiner
UNITED STATES PATENTS
3,053,227    9/1962    Mitchell _____ 198—215

SAMUEL F. COLEMAN, Primary Examiner.
ERNEST A. FALLER, Examiner.